United States Patent [19]
Nelander

[11] Patent Number: 6,069,582
[45] Date of Patent: May 30, 2000

[54] METHOD AND APPARATUS FOR SYNTHESIZING MULTI-CHANNEL RADAR OR SONAR DATA

[75] Inventor: James C. Nelander, Franktown, Colo.

[73] Assignee: Lockheed Martin Corporation, Bethesda, Md.

[21] Appl. No.: 09/161,331

[22] Filed: Sep. 25, 1998

[51] Int. Cl.[7] .................................................. G01S 7/40
[52] U.S. Cl. ........................ 342/169; 342/159; 342/162
[58] Field of Search .................................... 342/159, 160, 342/161, 162, 169

[56] References Cited

U.S. PATENT DOCUMENTS

| | | | |
|---|---|---|---|
| 3,787,842 | 1/1974 | Thomas | 342/160 |
| 3,972,041 | 7/1976 | Howard | 342/89 |
| 5,748,143 | 5/1998 | Melvin, Jr. | 342/162 |
| 5,907,302 | 5/1999 | Melvin, Jr. et al. | 342/162 |

OTHER PUBLICATIONS

Madurasinghe, D., "Low cost method to obtain clutter data for space time adaptive processing studies utilising an existing radar platform", TENCON '96. Proceedings., 1996 IEEE TENCON. Digital Signal Processing Applications, vol. 2, 1996, p. 840.

Nohara, T.J. et al, "Airborne ground moving target indication using non–side–looking antennas", Radar Conference, 1998. RADARCON 98. Proceedings of the 1998 IEEE, 1998, pp. 269–274.

Melvin, W.L. et al, "Assessment of multichannel airborne radar measurements for analysis and design of space–time processing architectures andalgorithms", Radar Conference, 1996., Proceedings of the 1996 IEEE National, 1996, pp. 130–135.

Guerci, J.R. et al, "Predictive–transform space–time processing for airborne MTI radar", Aerospace and Electronics Conference, 1994. NAECON 1994, Proceedings of the IEEE 1994 National, 1994, pp. 47–56, vol. 1.

Caves, R.G. et al, "Multi–channel SAR segmentation: algorithms and applications", Image Processing for Remote Sensing, IEE Colloquium on, 1996, pp. 2/1–2/6.

Goldstein, J.S. et al, "A multistage STAP CFAR detection technique", Radar Conference, 1998. RADARCON 98. Proceedings of the 1998 IEEE, pp. 111–116.

*Primary Examiner*—John B. Sotomayor
*Attorney, Agent, or Firm*—Holme Roberts & Owen LLP

[57] ABSTRACT

Synthesized multi-channel data is provided based on real world single channel data, thereby yielding data with high fidelity that can be used to test multi-channel equipment and processing techniques. Simulated data representing time dependent characteristics of moving targets can be integrated with the synthesized multi-channel data. In one embodiment a multi-channel data generator (20) includes a real radar data module (30), a computer simulated radar data module (40) and a composite radar data module (50). The real radar data module (30) generates synthesized multi-channel background data (38) based on real world single channel radar data (32). The computer simulated radar data module (40) includes a temporal signal model (42) and a radar signal simulator (44) for generating multi-channel time dependent data (46). The composite radar data module (50) receives the synthesized multi-channel background data (38) and the simulated time-dependent data (46) and integrates this data (38 and 46) together with application specific signal modification data (52) to generate composite data (54) with realistic background data and time-dependent characteristics.

16 Claims, 2 Drawing Sheets

1

METHOD AND APPARATUS FOR SYNTHESIZING MULTI-CHANNEL RADAR OR SONAR DATA

FIELD OF THE INVENTION

The present invention relates generally to synthesizing radar or sonar data for use in assessing system design concepts, signal processing algorithms and other sonar or radar-related equipment and processes. In particular, the present invention relates to the use of single channel data to synthesize multi-channel (more than one channel) data. The description which follows is made in terms of multi-channel sidelooking radar but applies equally to sidelooking sonar.

BACKGROUND OF THE INVENTION

Radar is used in a variety of situations including many down-looking applications, i.e., applications where an air or space borne radar platform is used to direct signals downwardly towards the ground. Such down-looking systems are used in or have been proposed for a variety of applications, including terrain mapping and moving target detection and tracking. For target tracking and other applications that include moving or time-dependent elements, multi-channel radar systems are generally preferred. Multi-channel systems typically involve at least one radar signal source and two or more detector elements. The source emits radar pulses that reflect off of the target as well as ground clutter and are received by the detector elements. By comparing phase differences between the return signals detected by the various elements, ranging and direction information can be obtained for the target.

An important multi-channel radar system application relates to distinguishing target information from ground clutter. One technique for identifying targets having time-dependent effects involves obtaining multiple radar samples at the same point in space but at different times. This can be accomplished, for example, by using a multi-channel system where the detector elements for the various channels are spaced apart relative to a travel path of the radar platform. The radar pulses can be synchronized relative to the travel speed and detector element spacing; such that at least two detector elements obtain samples at substantially the same point in space at different times (e.g., time separated by an integer multiple of the pulsing period). The resulting samples for a given location can then be compared e.g., by using digital subtraction algorithms, to suppress background clutter (that has no time dependency) relative to moving target data (that changes position over time). In practice, the actual processing algorithms involved are more complicated and account for signal beam width, geometric anomalies related to platform attitude variations relative to the flight path, and other complicating factors. A second multi-channel application involves no moving targets but seeks instead to increase the area coverage rate of a terrain mapping system by means of a technique known as vernier array.

New multi-channel radar related equipment and processes are continuously under development. Although such equipment and processes can be modeled theoretically, to some extent, it is generally desired to assess performance based on radar data prior to real-world implementation. The most direct way to conduct such testing is to build a bench model and fly the radar equipment to obtain data. However, this is also very expensive and time consuming. There is therefore a need for a convenient and realistic source of multi-channel radar data for testing purposes.

SUMMARY OF THE INVENTION

Most radar or sonar signal processing algorithms seek to enhance a weak signal with respect to competing noise and interfering signals to enable detection of the weak signal. For down-looking radar, the interfering signals consist of thermal noise and radar echoes from the ground clutter. Consequently the effectiveness of these radar signal processing algorithms depends upon the spatial, temporal and statistical characteristics of the ground clutter signal as well as certain design parameters of the radar. Some down-looking radar systems involve a single signal channel while others employ two or more radar channels. Normally single channel radar systems are less expensive and less complicated than multi-channel radar systems. However, multi-channel radar systems provide greater flexibility and capability than single channel systems. The development of advanced signal processing algorithms, particularly digital signal processing algorithms, for multi-channel radar systems has become an important area of development. The development, testing, validation and demonstration of such multi-channel radar systems requires multi-channel radar data. Two options for providing multi-channel data for such algorithm and design development efforts are: (1) actual multi-channel radar data; and (2) computer generated radar data. In one implementation, the present invention addresses a third option—a composite of computer generated data and actual radar data. It provides a method to provide data representative of a particular set of radar design parameters and actual clutter characteristics and statistics as well as those of target signals which have temporal and spatial characteristics which differ from those of the clutter. This invention should have a cost benefit over development of application specific multi-channel radar platforms for collecting databases for algorithm testing and concept assessment and will provide data which has greater fidelity than that generated entirely by computer simulation.

In addition, the present invention allows for the use of real-world single channel radar data, such as archived data obtained from a database, to generate synthesized multi-channel data. If needed for a specific application, the synthesized multi-channel data can be modified to include computer generated time dependent data, for example, to simulate moving target data, or to provide data representative of a particular set of radar design parameters. In this manner, the resulting combination of synthesized multi-channel data and simulated time dependent data can provide realistic radar clutter statistics based on real-world radar data while incorporating time varying signal characteristics and reflecting the design parameters of the radar system. Consequently, a useful tool is provided for assessing radar-related instrumentation and processes without flying a bench model, thereby saving time and money.

According to one aspect of the present invention, a method is provided for generating synthesized multi-channel radar or sonar (generically "coherent sensor") data based on a real world data set. The method includes the steps of obtaining single channel coherent sensor data for a number of positions of a single channel coherent sensor receiver at a number of times, and using the single channel coherent sensor data to provide synthesized real world coherent sensor data set corresponding to a multi-channel receiver. The real world data can be obtained from a database of archived real world data obtained by a coherent sensor system in an airplane, helicopter, ship or other vehicle. This real world data can then be resampled into "N" data sets, where N represents the number of channels of the coherent sensor data to be synthesized. The real world data can be used to provide synthesized data for a particular multi-channel application being modeled through a process of data resampling, scaling and spatial correlation as required. The resulting synthesized coherent sensor data thereby includes characteristics of stationary background clutter based on the real-world data for enhanced fidelity.

According to another aspect of the present invention, real world coherent sensor data is used in combination with simulated coherent sensor data to generate composite data. The corresponding method includes the steps of: obtaining real world coherent sensor data based on operation of a real world coherent sensor system; obtaining coherent sensor signal collection parameter values relative to the archived data set; using the coherent sensor signal collection parameter values in a computer modeling system to generate simulated coherent sensor data; and combining i he real world coherent sensor data and the simulated coherent sensor data to generate composite coherent sensor data. The step of obtaining real world coherent sensor data may involve accessing a database of archived coherent sensor data, e.g., obtained by a single channel source. In addition, the step of obtaining real world data involves synthesizing multi-channel data.

The computer modeling system may use parameter values relating to, for example, the flight speed, altitude, direction, pulse repetition frequency, beam width, power, etc. of the real world data to generate simulated data correlated to the real world data. Based on such parameter values, the computer modeling system can model, for example, the reflection characteristics of a time-dependent signal scatterer, such as a moving target, as such a target (if present when the real world data was obtained) would have appeared to the real world coherent sensor system. The resulting composite data can thus include characteristics of both background clutter based on real-world data and at least one time-dependent simulated scatterer such as a moving target.

In one embodiment of the present invention, a multi-channel data generator provides synthesized multi-channel radar data based on archived radar data. The generator receives the archived single channel data and resamples the data into data sets dependent on the multi-channel system of interest. For example, in the case of a three channel system, the data is resampled into sets including three data samples. The real world data samples each have different time stamps as such single channel samples are obtained in series. The generator therefore changes the time stamps so that the samples of each resampled set have a common time stamp, thus yielding synthesized multi-channel data. For applications involving time-dependent characteristics, such as moving target detection, such time dependent characteristics can be generated by a computer modeling system based on knowledge of the reflection characteristics of the moving target or other scatterer or to be modeled, as well as the radar detection parameter values associated with the real world data. The synthesized multi-channel radar data can then be combined with the computer simulated data to provide composite multi-channel data having real world background characteristics and modeled time-dependent characteristics.

BRIEF DESCRIPTION OF THE DRAWINGS

For a more complete understanding of the present invention and further advantages thereof, reference is now made to the following detailed description, taken in conjunction with the drawings, in which.

DETAILED DESCRIPTION OF THE INVENTION

Multi-channel data can be used in a variety of signal processing applications including (1) displaced phase center antennas (DPCA); (2) monopulse or phase comparison bearing estimation; (3) space time adaptive processing (STAP); and (4) vernier array processing. These applications include signal measurements: (a) from the same location but at different times; or (b) from different locations but at the same time.

In the following description, the invention is set forth in the context of a moving target indicator (MTI) radar which uses a multi-channel radar technique known as displaced phase center antenna (DPCA) processing. The invention is used to synthesize data that would be obtained from such a system in order to, for example, assess a particular radar design and/or processing algorithm. By way of example, if the system under design is intended to be used for moving target detection, the system may be assessed with regard to its ability to distinguish time-dependent moving target data (e.g., representative of a ground vehicle) from stationary background clutter. In the following description, an MTI radar and associated DPCA processing technique are first described, followed by descriptions of the multi-channel data generator process of the invention and a system for implementing the process. It will be appreciated that the particular implementation of the invention described below is presented for the purpose of illustrating the invention and the invention is not limited to any such specific implementations.

Figure 1:
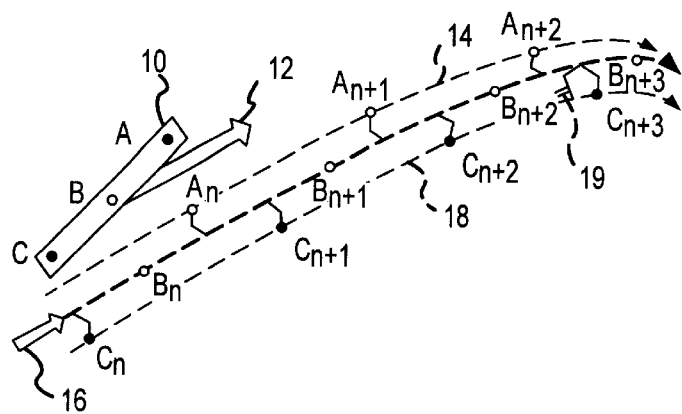
FIG. 1 illustrates a collection geometry for a multi-channel radar antenna for which data can be synthesized in accordance with the present invention.

FIG. 1 shows an MTI radar antenna 10 including three signal receiver elements designated A, B and C. The direction of flight of the antenna 10 is generally indicated by arrow 12. The corresponding flight paths of the individual elements are indicated by dashed lines 14, 16 and 18. The antenna 10 is shown as being slightly offset from the flight path lines 14, 16 and 18 for purposes of illustration. Along the flight paths, various sample locations for the individual elements A, B and C are indicated. In particular, the sample points for a first, or nominal, time are identified as $A_n$, $B_n$ and $C_n$. The sample points for successive sample times/locations, corresponding to succeeding radar pulses, are indicated by points $A_{n+1}$, $B_{n+1}$, $C_{n+1}$, then $A_{n+2}$, $B_{n+2}$, $C_{n+2}$ and so on.

In a simple illustration, the attitude of the antenna 10 could be controlled so that the elements A, B and C were aligned with the direction of the flight path, i.e., such that the paths 14, 16 and 18 coincided. In such a case, element B would fly over a particular location momentarily after element A, and element C would then fly over the same location momentarily after element B. By appropriate selection of the pulse repetition frequency (PRF) relative to the inter-element spacing and platform flight speed, sample points A, $B_{n+1}$ and $C_{n+2}$ could be caused to coincide such that data for the same spatial location could be obtained for three separate times.

The DPCA processing may then be used to suppress the background clutter (that has no time variation) relative to data from moving targets (which changes position over the three sampling times due to their motion) in order to enhance detection of the moving targets. For example, such processing may involve a form of digital subtraction such that data not having a time dependency tends to cancel out, thereby enhancing, on a relative basis, the time dependent signals. In reality, a number of factors complicate such processing. For example, as illustrated, variations in antenna attitude relative to the flight direction and variations in the flight path can result in temporal and geometric characteristics that differ as between co-processed samples. In addition, there may be variations in the powers and noises associated with the various channels. Other complicating factors include considerations relating to signal beam width/power distribution, path length or other geometric variations relating to spatial displacement between the signal source and their respective elements and uncertainty regarding element position (generally indicated in FIG. 1 by box 19). These complicating factors, make practical applications of MTI radar and DPCA processing very challenging. Providing radar data for assessing new designs, algorithms and the like is therefore of significant importance.

Figure 2:
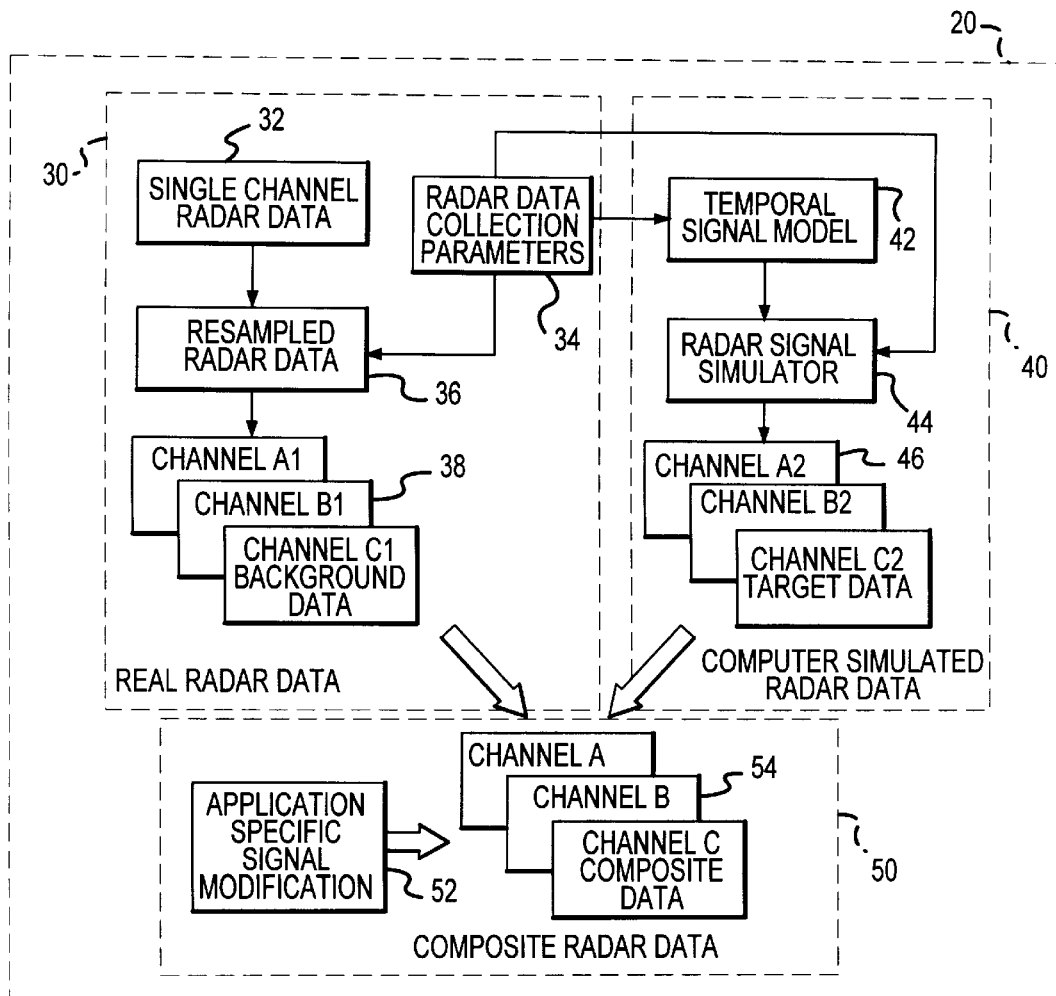
FIG. 2 illustrates a process flow for generating composite multi-channel radar data in accordance with the present invention.

FIG. 2 illustrates a multi-channel data generator (MDG) 20 in accordance with the present invention. The MDG 20 may be embodied in software or other logic for use in connection with a radar analyzer system. The illustrated MDG 20 generally includes three modules: a real radar data module 30 for synthesizing multi-channel data based on real world single channel data; a computer simulated radar data module 40 for generating time-dependent signal data; and a composite radar data module 50 for integrating the synthesized multi-channel data and the computer generated time-dependent data to yield composite data having realistic radar clutter statistics and time-varying signal characteristics that are uniquely manifested in multi-channel radar data.

Real radar data module 30 generates synthesized multi-channel data based on real world single-channel radar data 32, i.e., data having a one-to-one correspondence of sampling time to sampling location. The single channel data 32 can be obtained from any of various databases of archived radar data previously obtained by aircraft, satellite or other platform.

The real world data module 30 also receives an input concerning radar data collection parameters 34. This allows the module to account for differences between the collection parameters of the single channel system used to acquire the real world data and those of the desired system, e.g., the multi-channel design being tested or the hypothetical multi-channel system used for assessing a proposed processing technique. Examples of the collection parameters 34 include flight speed, altitude, direction, PRF, beam width, power, etc. Knowledge of these parameters 34 is useful for data resampling, as described below, as well as certain scaling and spatial correlation functions.

The process flow for the MDG 20 generally involves obtaining the single channel archived radar data 32 and resampling 36 the archived radar data to "N" data sets (three are shown in FIG. 2) corresponding to the relative spatial positions of the receiver elements of the different channels to be analyzed or tested. This has the effect of creating three channels of radar data from one. Since there is a one to one correspondence of time and position for the single channel data used as an input, the time tags associated with the new channels of data do not correspond to the times for three samples collected by a three channel system at those same sample points. At this point the assertion is made that the source data represents radar reflections from fixed objects on the earth's surface. This means that these radar signals have spatial dependence (i.e., their values change depending on slight changes in viewing geometry) but no intrinsic time dependence (i.e., they are stationary). The time tags associated with each new data set are reset to correspond to the receive channel configuration under investigation. The time stamps of each of the data samples of a given resampled set are therefore reset, in the illustrated embodiment, to a given time (nominally, $t_n$) for a given synthesized multi-channel sample point, thereby yielding multi-channel background data 38 based on the real world, single channel radar data 32. The time stamps of data samples of succeeding resampled sets can be set to values $t_{n+1}$, $t_{n+2}$ and so on based on the PRF of the multi-channel system under analysis. The resulting data sets (A1, B1 and C1) thus rep resent radar signals that would be collected from fixed objects, including background clutter, from a three channel radar system whose receivers follow one another along the flight path of the single channel radar platform which originally collected the data. Modifications representing phase and time delays for specific applications can be made to these data sets to represent flight path spatial deviations or radar channel imbalances. In addition to the constraint that the radar data represent only signals from fixed objects, the correlation characteristics of the thermal noise of the receivers differs from that of a truer three channel system but the relative noise power does not. This correlated noise characteristic permits additional flexibility in multi-channel analysis by allowing the user to adjust signal to noise ratio for the multi-channel application.

The computer simulated radar data module 40 includes a temporal signal model 42 and a radar signal simulator 44 for generating multi-channel time dependent data 46. The temporal signal model 42 models the radar characteristics of time-dependent targets such as, moving vehicles. The modeling can employ conventional techniques for generating radar data based on the size and shape of the modeled target, the reflection characteristics of the target and other criteria. This modeling information is used, together with elements of the radar data collection parameter 34, by the radar signal simulator 44 to generate simulated time-dependent data for each of the "N" channels. In this regard, the radar data collection parameters 34 provide information regarding sampling viewpoint geometry and PRF that is useful for scaling and other geometric correlation. The resulting simulated time-dependent data 46 is generated in "N" sets corresponding to the "N" channels of the multi-channel system under investigation, and is generated to correspond to the sampling times/PRF of the multi-channel system.

The composite radar data module 50 receives the synthesized multi-channel background data 38 and the simulated time-dependent data 46, and integrates this data 38 and 46 together with application specific signal modification data 52 to generate composite simulated multi-channel data 54 with realistic background data and time-dependent characteristics. The application specific data 52 may include any application specific modifications relating to, for example, specific platform spatial characteristics, channel imbalances, receiver noise attitude or flight path characteristics, target position or identification uncertainty thresholds, etc. With regard to the simulated multi-channel data 38 and the time dependent data 46, the data 38 and 46 is integrated on a channel-by-channel and sample-by-sample basis. The resulting composite data 54 thus incorporates realistic background radar data based on the real-world, single-channel radar data 32 and time-dependent characteristics based on a temporal signal model 42.

Figure 3:
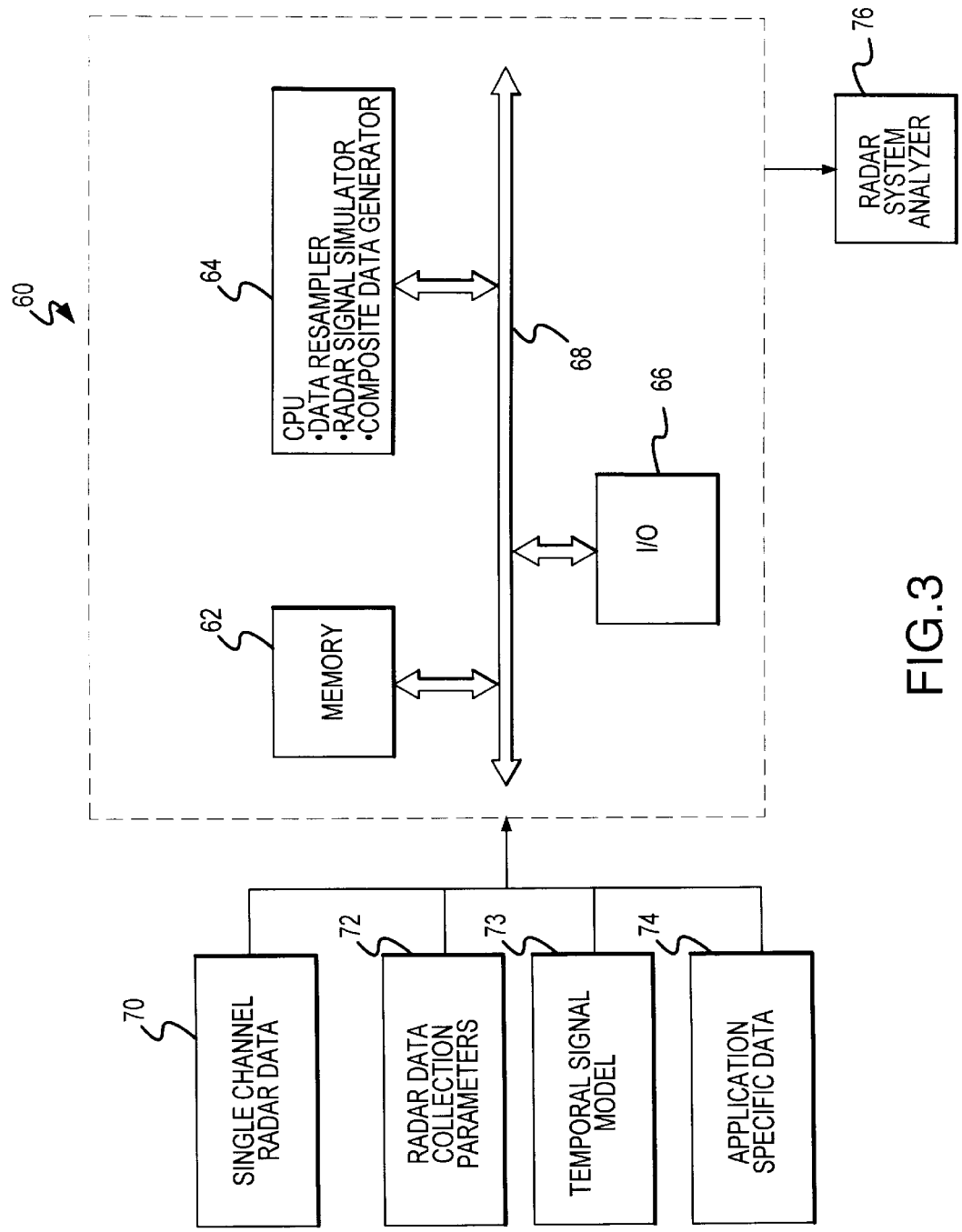
FIG. 3 is a schematic diagram of multi-channel data generator in which the process of FIG. 2 can be implemented.

FIG. 3 illustrates a multi-channel data generator (MDG) system 60 for implementing the processes/modules described above. The MDG system 60 generally comprises a computer system programmed or configured to execute logic embodying the above-noted processes/modules. In this regard, the MDG system 60 generally includes a memory 62, a central processing unit (CPU) 64, and input/output devices 66, all communicating via a data bus 68. The I/O devices 66 may include conventional user interfaces such as a keyboard, a mouse or the like and network connections, modems, disk drive ports and other devices for receiving software or data and/or exchanging data with other network nodes. The illustrated MDG 60 receives data via the I/O components 66 including, for example, the real-world single-channel radar data 70, radar data collection parameters 72, temporal signal model 73 and application specific data 74. This data may be stored, at least temporarily, in memory 62. The CPU accesses this data as required to run the data resampling logic, radar signal simulator logic, and integration logic for generating the composite simulated multi-channel data. This composite data can then be output to a radar system analyzer 76 for assessing radar-related designs or processes as desired. The analyzer may run on the same CPU 64 or the data may be communicated to an external analyzer via the I/O components 66.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A method for use in generating multi-channel coherent sensor data, comprising the step of:

receiving single channel coherent sensor data obtained by operating a single channel coherent sensor system in a real world environment; and synthesizing the single channel coherent sensor data to provide multi-channel data, wherein said multi-channel data is based on real world single channel data to provide realistic background characteristics without the need to obtain real multi-channel coherent sensor data by operating a multi-channel coherent sensor system in a real world environment;

wherein said single channel coherent sensor data comprises a series of samples having sequential time values reflecting the sequential acquisition of said single channel coherent sensor data by said single channel coherent sensor system, and said step of synthesizing comprises resampling said series of samples into sets of samples free from transformation into a frequency domain, wherein each set includes a plurality of samples having a common time value.

2. A method as set forth in claim 1, wherein said single channel coherent sensor data comprises radar data obtained by flying a single channel radar system on an airborne platform.

3. A method as set forth in claim 1, wherein said multi-channel data corresponds to an N channel coherent sensor system where N is an integer and said step of resampling comprises establishing said sets such that each set includes n samples.

4. A method as set forth in claim 1, further comprising the steps of obtaining simulated coherent sensor data for a target of interest and combining the simulated coherent sensor data with the synthesized multi-channel radar data to provide composite radar data.

5. A method as set forth in claim 4, wherein said step of obtaining simulated coherent sensor data comprises operating a computer simulation application to generate said simulated coherent sensor data based on characteristics of said target of interest.

6. A method as set forth in claim 5, wherein said synthesized multi-channel data includes N channels of data where N is an integer and said step of operating comprises generating said simulated coherent sensor data such that said simulated coherent sensor data includes N channels of data, wherein said N channels of synthesized data can be readily integrated with said N channels of simulated coherent sensor data.

7. A method as set forth in claim 5, wherein said step of operating comprises generating said simulated coherent sensor data such that said simulated coherent sensor data has time dependent characteristics corresponding to a time dependent scatterer such as a moving target.

8. A method as set forth in claim 5, wherein said step of operating comprises receiving data collection parameter values relating to the parameters governing collection of said single channel coherent sensor data and using said data collection parameter values to generate said simulated coherent sensor data.

9. A method for use in generating multi-channel radar coherent sensor, comprising the steps of:

obtaining single channel radar for a plurality of spatial positions of a single channel receiver at a plurality of times;

first using said single channel coherent sensor data to provide a real world coherent sensor data set corresponding to a multi-channel receiver, wherein said step of first using comprises modifying said multi-channel radar data to account for signal phase and time delays corresponding to specific multi-channel applications;

second using a signal model to generate a simulated coherent sensor data set corresponding to the positions and times said real world data set; and integrating said real-world data set and said simulated radar coherent sensor set to provide composite coherent sensor data for use in simulating multi-channel radar data;

wherein said simulated multi-channel radar data includes characteristics of stationary background clutter and at least one time dependent simulated radar scatterer.

10. A method as claimed in claim 9, wherein said step of second using comprises generating simulated time dependent effects corresponding to a simulated radar scatterer for each of said plurality of times and locations.

11. A method as claimed in claim 9, wherein said step of second using comprises generating first synthesized radar data based on the radar collection parameters of said single channel radar data, generating second simulated radar data including time dependent radar scatter effects, and combining said first and second radar data.

12. A method as claimed in claim 9, wherein said step of integrating comprises adding said simulated data set and said real world data set on a position dependent basis relative to said plurality of positions to provide composite radar data for use in simulating data of a receiver having a corresponding plurality of channels.

13. A method for use in generating simulated multi-channel radar data, comprising the steps of:

obtaining single channel radar data based on an archive of real-world radar data;

first generating simulated radar data corresponding to a simulated radar scatterer; and second generating composite radar data based on said single channel radar data and said simulated radar data, wherein said single channel radar data comprises a series of samples having sequential time values reflecting the sequential acquisition of said single channel radar data and said step of second generating comprising resampling said series of samples into sets of samples free from transformation into a frequency domain, wherein each set includes a plurality of samples having a common time value;

wherein said composite radar data can be used to simulate multi-channel radar data having both simulated radar clutter information and simulated time dependent scatter information.

14. A method as claimed in claim 13, wherein said step of first generating comprises generating said simulated radar data so as to have time dependent characteristics corresponding to a moving target.

15. An apparatus for use in generating multi-channel coherent sensor data, comprising:

first means for accessing single channel coherent sensor data obtained by operating a single channel coherent sensor system in a real world environment, wherein said single channel coherent sensor data comprises a series of samples having sequential time values reflecting the sequential acquisition of said single channel coherent sensor data;

processing means for synthesizing multi-channel data from the single channel coherent sensor data by resampling said series of samples into sets of samples free from transformation into a frequency domain, wherein each set includes a plurality of samples having a common time value; and output means for outputting the multi-channel data;

wherein said multi-channel data can be used for testing multi-channel equipment and multi-channel data processing.

16. An apparatus as set forth in claim 15, further comprising:

second means for accessing simulated coherent sensor data generated by a computer modeler; and means for combining the simulated coherent sensor data and the synthesized multi-channel data to provide composite multi-channel data.

* * * * *